United States Patent [19]
White

[11] 4,120,279
[45] Oct. 17, 1978

[54] BARBECUE PIT HANGER

[76] Inventor: Von M. White, 474 3rd Ave., Salt Lake City, Utah 84103

[21] Appl. No.: 732,364

[22] Filed: Oct. 14, 1976

[51] Int. Cl.² .......................... F24B 3/00; A47J 33/00
[52] U.S. Cl. ........................................ 126/30; 99/340; 248/125; 248/156
[58] Field of Search .................... 99/339, 340, 446; 126/25, 29, 30; 248/122, 123, 156, 185, 125

[56] References Cited
U.S. PATENT DOCUMENTS

| | | | |
|---|---|---|---|
| 1,319,792 | 10/1919 | Phorson | 248/123 |
| 1,667,639 | 4/1928 | Smith | 248/123 |
| 2,912,973 | 11/1959 | Lucas | 99/443 |

FOREIGN PATENT DOCUMENTS 737,246  6/1966  Canada ............................ 126/30

Primary Examiner—Harvey C. Hornsby
Assistant Examiner—Timothy F. Simone
Attorney, Agent, or Firm—B. Deon Criddle

[57] ABSTRACT

A compact, easily assembled barbecue pit hanger including a telescoping support post; a hanger arm that is anchored to the support post, that may be used to set the support post length or to elevate accessories suspended from the hanger arm, and cooking accessories that interlock with the hanger arm and support post for use.

5 Claims, 6 Drawing Figures

U.S. Patent  Oct. 17, 1978  4,120,279
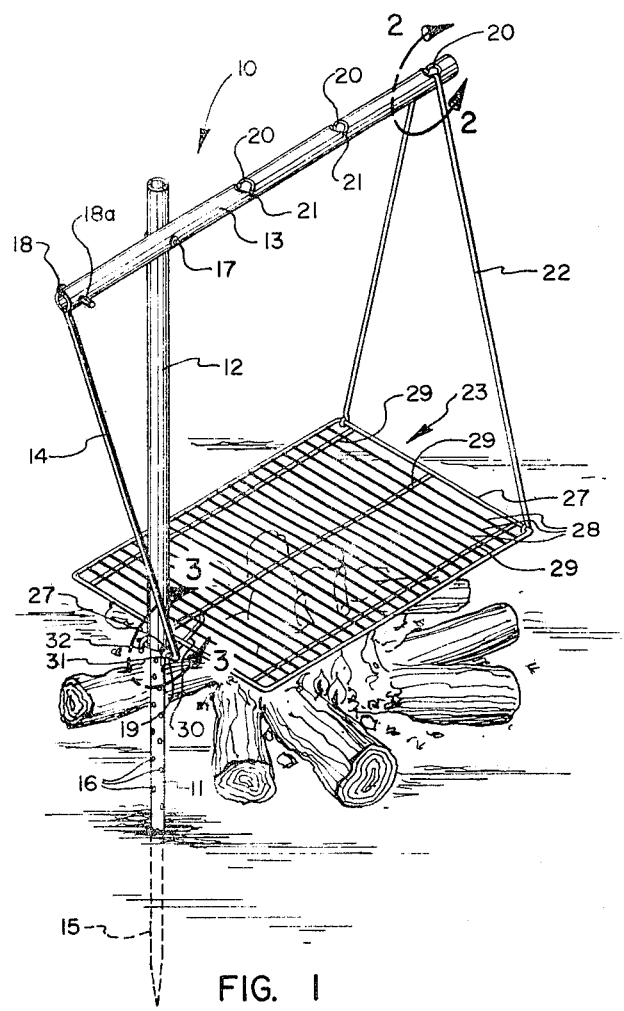
FIG. 1
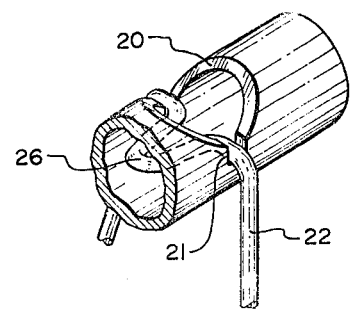
FIG. 2
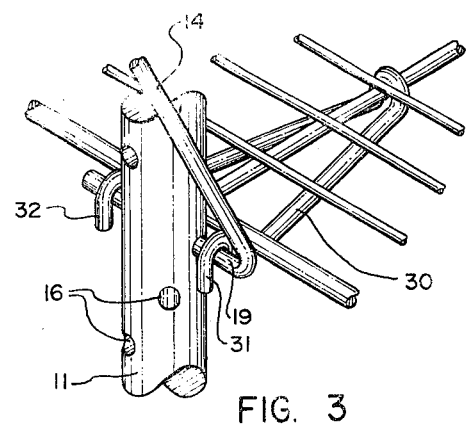
FIG. 3
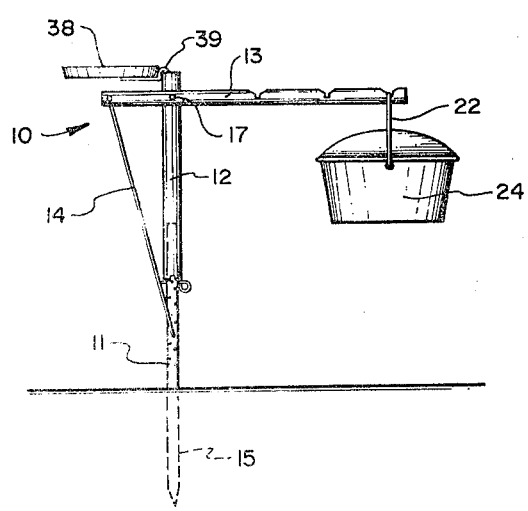
FIG. 4
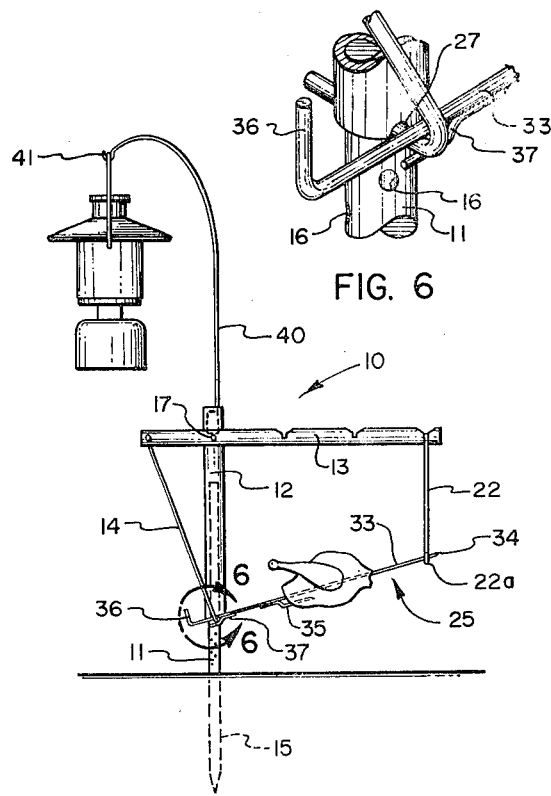
FIG. 6
FIG. 5

BARBECUE PIT HANGER

BRIEF DESCRIPTION OF THE INVENTION

1. Field of the Invention

This invention relates to devices for suspending food and cooking utensils over an open fire.

2. Prior Art

It has long been known to provide means for suspending food or utensils containing food and the like over an open fire for cooking purposes. A great many devices have been developed for the purpose. These range from crude devices such as bipods and tripods, supporting cross-bars from which the food or utensils are suspended, to very sophisticated structures, permanently installed over elaborate barbecue pits and often including such features as motorized spits to continuously or intermittently rotate food secured to the spit.

Portable supports providing for the cantilevered support of a grill over a cantilevered fire box have also been known. One such device is shown, for example, in U.S. Pat. No. 3,498,210. In this patent the support post provides a positive stop for a fire box and a grill is held at a desired position on the support post above the fire box by a binding action occuring between the post and a telescoping sleeve of the grill.

There has not, to my knowledge, heretofore been known a compact, easily assembled barbeque pit hanger wherein the means for locking a hanger arm in set position may also be the means for adjustably setting the length of the support post. More particularly, there has not, to my knowledge, heretofore been such a barbecue pit hanger wherein the means for locking the hanger arm to the support post also locks in position accessories suspended from the hanger arm.

Principal objects of the present invention are to provide a barbecue pit hanger that is compact, easily assembled, comprised of a few basic components and adaptable to use with a wide range of accessories.

Other objects are to provide such a barbecue pit hanger that is reliable and that will not collapse under the weight of food placed thereon and that is relatively inexpensive, when compared with other commercially available barbecuing units.

Principal features of the invention include a telescoping support post with a lower stake having adjustment holes spaced along the length thereof; an upper sleeve to which a hanger arm is pivotally mounted; a locking rod interconnecting the hanger arm and the lower stake and arranged to support the upper sleeve and accessories suspended from the hanger bar.

Additional objects and features of the invention will become apparent from the following detailed description and drawings, disclosing what is presently contemplated as being the best mode of the invention.

THE DRAWINGS

In the drawings:

FIG. 1 is a perspective view of the barbecue pit hanger of the invention, shown assembled and positioned with respect to a fire;

FIG. 2, an enlarged fragmentary perspective view, taken within the line 2—2 of FIG. 1;

FIG. 3, a similar view taken within the line 3—3 of FIG. 1, with the upper sleeve removed;

FIG. 4, a side elevation view of the barbecue pit hanger shown in a different use position and supporting different accessories than are shown in FIG. 1;

FIG. 5, another side elevation view of the barbecue pit hanger, shown supporting still other accessories; and FIG. 6, an enlarged, fragmentary, perspective view, taken within the line 6—6 of FIG. 5.

DETAILED DESCRIPTION

Referring now to the drawing:

In the illustrated preferred embodiment, the basic barbecue pit hanger of the invention, shown generally at 10, includes a lower stake 11, an upper sleeve 12, a hanger arm 13 and a locking rod 14.

The stake 11 is preferably pointed at a lower end 15 so that it can be easily driven into the ground and has spaced holes 16 along the length thereof. The upper sleeve 12 is tubular and is adapted to hang its lower end telescope down over the upper end of the stake 10.

Hanger arm 13 is pivotally connected by a pivot pin 17 to the upper end of upper sleeve 12 and the locking rod 14 has one end 18 bent to extend through a hole 18a provided therefore in one end of the hanger arm at one side of the pivot pin 17 and the other end 19 bent to extend fully through one of the holes 16 in the stake and beyond the stake, for purposes to be hereinafter explained in detail.

The length of hanger arm 13 extending from pivot pin 17 opposite to the locking rod 14 has V-shaped notches 20 spaced along an upper surface thereof. Each V-shaped notch terminates in a small slot 21 that extends transversely to the axis of the hanger arm, and that is adapted to receive a wire support hanger 22. As will be further explained, the wire support hanger is common to a number of food supporting accessories used with and forming part of the barbecue pit hanger 10. For example, as shown in FIG. 1, the wire support hanger 22 is secured to a grill 23 that is cantilevered from the stake 11. In FIG. 2, the wire support hanger 22 forms a handle for a pot, shown at 24, and in FIG. 5, the wire support hanger 22 comprises a loop 22a through which one end of a skewer 25 is inserted.

It is preferred that the wire support hanger 22 be bent to include a V-shaped projection 26, as shown best in FIG. 2. In using the wire support hanger including such a projection, the projection 26 is first inserted downwardly into a V-shaped notch 20 and then the hanger is turned so that the projection will extend into the hanger arm 13 and the portions of the wire support hanger adjacent to the projections are in the slot 21 formed with the notch 22.

The portion of hanger arm 13 extending from pivot pin 17 and including the notches 20 and slots 21 is heavier than the portion of the hanger arm extending in the opposite direction from pivot pin 17 and the hanger arm is locked against rotation about the pin 17, during use, by the locking rod 14.

In use, lower stake 11 is driven into the ground adjacent to a fire pit and the upper sleeve 12 is telescoped down over the stake.

Hanger arm 13 is pivoted to extend transversely to the upper sleeve and the end 18 of the hanger rod is inserted into hole 18a of the hanger arm. The end 19 of the locking bar is then inserted into a hole 16 of the stake that will position the hanger bar at a desired height and the upper sleeve is positioned such that opposed notches 27 (only one of which is shown) at the lower end thereof rest on the end 19. It will also be apparent that if the upper sleeve 12 is lifted on stake 11 until notches 27 clear end 19, the upper sleeve and hanger arm can be rotated to swing the arm from over the barbecue pit. This allows items to be easily and safely suspended from or removed from the hanger arm. It will be understood that by moving the sleeve up and down on the stake, and by positioning the end 19 in a selected hole 16, the height of the arm 13 above the ground can be varied, as desired.

When the stake, upper sleeve and hanger arm are positioned for use, as heretofore described, the pot 24, FIG. 4; the grill 23, FIGS. 1 and 3; or the skewer 25, FIG. 5, or other such accessory items can be suspended by the wire support hanger 22, positioned within a notch 20, as previously described.

The wire support hanger 22, may be an integral part of the accessory as shown in FIGS. 1, 3 and 4 or may be separate, as best shown in FIG. 5.

The grill 23 includes a wire exterior frame 27 to which the hanger 22 is pivotally connected and closely spaced parallel bars 28 supported by opposed sides of the exterior wire frame and by parallel braces 29 extending transversely thereto. A support member 30 is fixed to a central brace 29 and the exterior frame 27 and projects from the frame to form spaced apart hooks 31 and 32. The hooks 31 and 32 are adapted to straddle the upper sleeve 12 and to engage the end 19 of holding rod 14 to thereby support one end of the grill 23, the opposite end of which is supported by the wire hanger 22.

As best shown in FIGS. 5 and 6, the skewer 25 includes a shaft 33 with a pointed end 34 that is adapted to be inserted through an item to be roasted over a fire in the fire pit, and that is adapted to be inserted into the loop 22a, a tine 35, fixed to and projecting outwardly from and alongside the shaft to be inserted into and to stabilize the item being roasted. The shaft 33 is bent at the end opposite to pointed end 34 to form a handle 36 that can be used to turn the shaft and a bracket 37 fixed to the shaft 33 and extending towards handle 36 is adapted to straddle the locking rod 14 and to keep the skewer from falling out of the loop 22a. It will be apparent that if the shaft 33 and bracket 37 are pushed in the direction of loop 22 the bracket will clear the locking rod 14 and the skewer can be turned by the handle 36 to rotate the item being roasted. The bracket 37 can then be engaged with end 19 of the upwardly extending portions of locking rod 14 to prevent undesired turning of the skewer. When the skewer is used the pointed end 34 is angled upwardly to engage loop 22a, thus facilitating locking of the bracket 37 with locking rod 14 and maintaining engagement of the tine 35 in the item being roasted.

The open top of the upper sleeve 12 provides a support for a cantilevered shelf 38 having a hook 39 formed on or attached to the periphery thereof. As seen best in FIG. 4, the hook fits snugly into the open top of the sleeve and grips the top end to hold the shelf in place. In addition, one end of a rod 40 can be inserted down into the sleeve 12, and the other end of rod 40, which other end is preferably somewhat flexible, has a hook 41 thereon to receive a lantern handle, or the like when the rod is bent. While not shown, it will be apparent that rod 40 can, if desired, be made of telescoping sections that can be locked in their extended condition.

Although a preferred form of my invention has been herein disclosed, it is to be understood that the present disclosure is by way of example and that variations are possible without departing from the subject matter coming within the scope of the following claims, which subject matter I regard as my invention.

I claim:

1. A barbecue pit hanger comprising
   a stake having a plurality of holes therein, said holes being spaced along the length of said stake;
   an upper sleeve having a lower end adapted to telescope over an upper end of the stake;
   a hanger arm pivotally connected intermediate its length to an upper end of the upper sleeve, said hanger arm having a hole through one end thereof, and at least one notch formed in a top surface thereof adjacent the other end of the arm; and
   a locking rod having one end bent to extend through the hole in the hanger bar and the other end bent to extend through a hole in the stake when the hanger bar is extending substantially transversely to the stake and upper sleeve thereon; and a wire support hanger positioned in one of said notches of the hanger arm and suspended from the hanger arm; and a food supporting accessory supported at one of its ends by the wire supported at hanger and including a portion spaced from said one end supported by the end of the locking rod extending through the stake.

2. A barbecue pit hanger as in claim 1, including
   opposed notches formed in the lower end of the upper sleeve, said notches being adapted to fit over the end of the locking rod inserted through a hole in the stake.

3. A barbecue pit hanger as in claim 1, wherein
   the food supporting accessory comprises a wire grill having hooks at one end adapted to straddle the upper sleeve and to engage the end of the locking rod extending through the stake and means coupling an opposite end to the wire support hanger.

4. A barbecue pit hanger as in claim 1, wherein
   the food supporting accessory comprises a skewer having a pointed end journaled in the wire support hanger, a shaft extending from the pointed end between the upper sleeve and the locking rod, a handle end and a locking bracket adapted to engage the locking rod.

5. A barbecue pit hanger as in claim 1, further including
   a rod extending downwardly into the upper sleeve and upwardly therefrom, said rod having a hook thereon.

* * * * *